(12) United States Patent
Landrum et al.

(10) Patent No.: US 9,347,426 B2
(45) Date of Patent: May 24, 2016

(54) WIND TURBINE BLADE RAILROAD TRANSPORTATION SYSTEM AND METHOD

(71) Applicants: Scott C. Landrum, Southlake, TX (US); T. Christopher King, Keller, TX (US)

(72) Inventors: Scott C. Landrum, Southlake, TX (US); T. Christopher King, Keller, TX (US)

(73) Assignee: Transportation Technology Services, Inc., Southlake, TX (US)

( * ) Notice: Subject to any disclaimer, the term of this patent is extended or adjusted under 35 U.S.C. 154(b) by 38 days.

(21) Appl. No.: 14/467,144

(22) Filed: Aug. 25, 2014

(65) Prior Publication Data

US 2016/0053740 A1 Feb. 25, 2016

(51) Int. Cl.
*B60P 3/40* (2006.01)
*F03D 1/00* (2006.01)
*B61D 45/00* (2006.01)

(52) U.S. Cl.
CPC ............... *F03D 1/005* (2013.01); *B61D 45/00* (2013.01)

(58) Field of Classification Search
CPC ........................................................ B60P 3/40
USPC ............... 410/44, 45, 53, 32, 33, 46, 120; 211/60.1; 220/1.5, 23.2, 23.4
See application file for complete search history.

(56) References Cited

U.S. PATENT DOCUMENTS

| | | | |
|---|---|---|---|
| 6,983,844 B2 | 1/2006 | O'Kane et al. | |
| 7,303,365 B2 | 12/2007 | Wobben | |
| 7,670,090 B1 | 3/2010 | Landrum et al. | |
| 7,704,024 B2 | 4/2010 | Kootstra et al. | |
| 7,713,007 B2 | 5/2010 | Kootstra | |
| 8,056,203 B2 | 11/2011 | Madsen | |
| 8,096,739 B1 | 1/2012 | Landrum et al. | |
| 8,192,117 B1 | 6/2012 | Landrum et al. | |
| 8,240,962 B2 | 8/2012 | Livingston et al. | |
| 8,342,491 B2 | 1/2013 | Jorgenson et al. | |
| 8,382,407 B1 | 2/2013 | Landrum et al. | |
| 8,602,700 B2 | 12/2013 | Johnson | |
| 8,622,670 B2* | 1/2014 | Vitor | 410/44 |
| 8,632,286 B2 | 1/2014 | Wessel et al. | |
| 8,672,131 B2* | 3/2014 | Nogueira et al. | 206/521 |
| 8,708,625 B1* | 4/2014 | Landrum et al. | 410/44 |
| 2007/0189895 A1* | 8/2007 | Kootstra et al. | 416/9 |
| 2009/0020445 A1* | 1/2009 | Koike | 206/319 |
| 2011/0131785 A1* | 6/2011 | Madsen | 29/428 |
| 2014/0353266 A1 | 12/2014 | Frederiksen | |
| 2015/0198140 A1* | 7/2015 | Sigurdsson | |
| 2015/0329036 A1* | 11/2015 | Johnson et al. | |

* cited by examiner

*Primary Examiner* — H Gutman
(74) *Attorney, Agent, or Firm* — Dan Brown Law Office; Daniel R. Brown (57) ABSTRACT

A system and method for transporting a first and second airfoil using a center railcar coupled to two additional railcars. A pair of root brackets support the root ends of the two airfoils on the two additional cars, aligning the two airfoils over the center car. A lower sling stand on the center railcar has a pair of vertical side members extending upwardly to hang a lower sling that support the first airfoil. An upper sling stand has a base that is supported by the lower sling stand, and also has a pair of upper side members that support an upper sling. The second airfoil is supported by the upper sling. The upper sling stand is fixedly supported on the lower sling stand so as to support the second airfoil above the first airfoil in overlapping fashion.

19 Claims, 6 Drawing Sheets

WIND TURBINE BLADE RAILROAD TRANSPORTATION SYSTEM AND METHOD

BACKGROUND OF THE INVENTION

1. Field of the Invention

The present invention relates to transporting wind turbine blades. More specifically, the present invention relates to a system and method for transporting pairs of long airfoils via railroad using a dual blade sling stand.

2. Description of the Related Art

Large-scale wind turbines are used to generate electrical power. Wind turbines consist of a tower, a generator nacelle, a rotor hub and two or more wind turbine blades. At the time of this writing, wind turbine blades are manufactured in excess of fifty meters in length. Wind turbine blades are one type of airfoil, and airplane wings are anther type of airfoil, for example. Among other modes of transportation, wind turbine blades are transported by railroad, most commonly on rail flatcars. Since the length of a standard rail flatcar is about twenty-eight meters, coupler to coupler, it's clear that two railcars are required to transport a single blade that has a length of approximately 50 meters. The cost of transporting wind turbine components is considerable, and there is certainly a motivation to keep costs to a minimum. These costs include direct railroad expenses for rail transportation, and also include costs associated with building and handling fixtures as well as the cost of loading and unloading wind turbine blades on railcars.

The inventors of the present disclosure have a number of issued patents that address other aspects of wind turbine blade rail transportation. Among these are U.S. Pat. No. 7,591,621, issued Sep. 22, 2009, for Wind Turbine Blade Transportation System and Method, which teaches the use of two railcars and three mounting fixtures to transport a single wind turbine blade. And, U.S. Pat. No. 7,670,090, issued Mar. 2, 2010, for Wind Turbine Blade Transportation System and Method, which teaches the use of three railcars and four mounting fixtures to transport a pair of wind turbine blades. And, U.S. Pat. No. 8,708,625, issued Apr. 29, 2014, for Wind Turbine Blade Railroad Transportation System and Method, which teaches another technique to use two railcars and three mounting fixtures to transport a single wind turbine blade. The entire disclosures of these three patents are hereby incorporated by reference.

It is common for a large number of wind turbine blades to be shipped on a single train from a manufacturer or an intermodal point of transfer to a location near a wind turbine farm. There are opportunities to manage rail transportation costs for wind turbine blades by limiting the number or railcars needed for transport, using mounting fixture efficiently, and minimizing the amount of labor required to load and unload trains. Thus it can be appreciated that there is a need in the art for a system and method addressing the problems related to transportation of long wind turbine blades and other long airfoils via rail.

SUMMARY OF THE INVENTION

The need in the art is addressed by the systems and methods of the present invention. The present disclosure teaches a system for transporting a first and second airfoil, each having a root end, midsection, and tip, using a center railcar coupled to a first and second railcar. The system includes a first bracket and a second bracket for disposition between the root end of the first and second airfoils and the first and second railcars, respectively, both of which orient the tips of the airfoils toward the center railcar. The system also includes a lower sling stand that includes a lower base for attachment to the center railcar, and a pair of lower side members that extend upwardly from the base, which define an opening between the pair of lower side members through which the first airfoil can be inserted into the lower sling stand. A lower sling is hung between the pair of lower side members to support the first airfoil along its midsection. The system further includes an upper sling stand including an upper base, which is attached to the pair of lower side members, and a pair of upper side members extending upwardly from the upper base. An upper sling hung between the pair of upper side members to support the second airfoil along its midsection. The upper base is attached to the pair of lower side members in a manner to position the upper sling to support the midsection of the second airfoil above the midsection of the first airfoil.

In a specific embodiment, the foregoing system further includes a lower lateral guide positioned to limit lateral movement of the first airfoil between the pair of lower side members, and also includes an upper lateral guide positioned to limit lateral movement of the second airfoil between the upper pair of side members. In a refinement to this embodiment, the lower lateral guide further includes a pair of lower rollers rotatably supported from the lower sling stand, which are aligned to engage the first airfoil and limit lateral movement thereof, and the upper lateral guide further include a pair of upper rollers rotatably supported from the upper sling stand, which are aligned to engage the second airfoil and limit lateral movement thereof.

In a specific embodiment of the foregoing system, the lower sling and the upper sling are made with plural webbing straps, and, the lower sling and the upper sling are removably attached to the lower sling stand and the upper sling stand, respectively, with plural chains, and, the flexibility of the lower sling and the upper sling accommodate misalignment of the first airfoil and the second airfoil, respectively.

In a specific embodiment, the foregoing system further includes a lower alignment member disposed about the pair of lower side members, and an upper alignment member disposed about the upper base, which are engaged together to fixedly locate the upper sling stand above the lower sling stand. In a refinement to this embodiment, the lower alignment member includes plural tapered extensions from the lower side members, and the upper alignment member includes plural openings in the upper base that are sized to receive the plural tapered extensions.

In a specific embodiment, the foregoing system further includes a latch positioned to secure the upper sling stand on the lower sling stand. In a refinement to this embodiment, the latch includes at least a first hasp suitable to receive a security padlock.

In a specific embodiment of the foregoing system, the first bracket and the second bracket enable rotation of the root end of the first airfoil and the second airfoil, respectively, about a vertical axis of rotation.

The present disclosure also teaches an apparatus for supporting the midsections of a first and second airfoil above a railcar. The apparatus includes a lower sling stand that includes a lower base, attachable to the railcar, and a pair of lower side members that extend upwardly from the base, which define an opening between the pair of lower side members through which the first airfoil can be inserted into the lower sling stand. The apparatus also includes a lower sling, made with plural webbing straps that is hung between the pair of lower side members to support the first airfoil along its midsection. The apparatus further includes an upper sling stand that has an upper base, attachable to the pair of lower side members, and a pair of upper side members extending upwardly from that base. An upper sling, made with plural webbing straps, is hung between the pair of upper side members to support the second airfoil along its midsection. A pair of lower rollers are rotatably supported from the lower sling stand, and are aligned to engage the first airfoil and limit lateral movement between the pair of lower side members, also, a pair of upper rollers are rotatably supported from the upper sling stand, and are aligned to engage the second airfoil and limit lateral movement between the upper pair of side members. The apparatus also includes a lower alignment member that is disposed about the pair of lower side members, and, an upper alignment member that is disposed about the upper base, for engaging the lower alignment member and thereby fixedly positioning the upper sling to support the midsection of the second airfoil above the midsection of the first airfoil.

The present disclosure teaches a method of transporting a first and second airfoil, each having a root end, midsection, and tip, using a center railcar coupled to a first and second railcar, and using a first root bracket, a second root bracket, a lower sling stand having a lower base and a pair of lower side members extending upwardly therefrom that define an opening between the pair of lower side members, a lower sling, an upper sling stand having an upper base and a pair of upper side members extending upwardly therefrom, and an upper sling. The method includes the steps of attaching the first root bracket between the root end of the first airfoil and the first railcar, thereby orienting the tip of the first airfoil toward the center railcar, and also, attaching the second root bracket between the root end of the second airfoil and the second railcar, thereby orienting the tip of the second airfoil toward the center railcar. The method further includes attaching the lower base of the lower sling stand to the center railcar, and hanging the lower sling between the pair of lower side members. Then, inserting the first airfoil into the opening between the pair of lower side members, and supporting the first airfoil, along its midsection, on the lower sling. The method also includes stacking the upper base of the upper sling stand on the pair of lower side members of the lower sling stand, and hanging the upper sling between the pair of upper side members, and supporting the second airfoil, along its midsection, on the upper sling, and thereby positioning the midsection of the second airfoil above the midsection of the first airfoil.

In a specific embodiment, the foregoing method further includes positioning a lower lateral guide with respect to the lower sling stand, thereby limiting lateral movement of the first airfoil between the pair of lower side members, and positioning an upper lateral guide with respect to the upper sling stand, thereby limiting lateral movement of the second airfoil between the upper pair of side members. In a refinement to this embodiment, the lower lateral guide includes a pair of lower rollers that are rotatably supported from the lower sling stand, for engaging the first airfoil, thereby limiting lateral movement thereof, and, the upper lateral guide includes a pair of upper rollers that are rotatably supported from the upper sling stand, for engaging the second airfoil, thereby limiting lateral movement thereof.

In a specific embodiment of the foregoing method, where the lower sling and the upper sling are made with plural webbing straps, the method further includes attaching the lower sling to the lower sling stand using plural chain, and attaching the upper sling to the upper sling stand using plural chains, and thereby accommodating misalignment of the first airfoil and the second airfoil by virtue of the flexibility of the chains.

In a specific embodiment of the foregoing method, where the lower sling stand includes a lower alignment member disposed about the pair of lower side members, and the upper sling stand includes an upper alignment member disposed about the upper base, the method further includes engaging the lower alignment member with the upper alignment member, thereby fixedly locating the upper sling stand above the lower sling stand. In a refinement of this embodiment, the lower alignment member includes plural tapered extensions from the lower side members, and the upper alignment member includes plural openings in the upper base that are sized to receive the plural tapered extensions.

In a specific embodiment, the foregoing method further includes securing the upper sling stand to the lower sling stand using a latch. In a refinement to this embodiment, the latch includes at least a first hasp suitable for receiving a security padlock.

In a specific embodiment of the foregoing method, where the first bracket and the second bracket include a vertical axis of rotation, the method further includes enabling rotation of the root end of the first airfoil and the second airfoil about the vertical axes of rotation.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

The teachings herein address the problems associated with transporting large wind turbine blades and other large airfoils via railroad. The illustrative embodiments presented are principally directed to wind turbine blades, however they are applicable to any large airfoil or similarly structured devices. Such airfoils and devices share the characteristic of a rigid root end that is designed with sufficient strength to support the entire airfoil and accommodate the flexing and stresses involved during operation thereof. Such airfoils are typically tapered through a midsection to a tip end. The section modulus of the airfoil gradually decreases from the root end to the tip end. Generally, the strength profile of the airfoil decreases from the root end to the tip end. In considering the need to support such an airfoil during transportation, it will be appreciated that the airfoil will typically lie in a substantially horizontal orientation, and require two or more support locations. The longitudinal axis of the airfoil will also be generally aligned with the longitudinal axis of the train. During the transportation of an airfoil, the stresses and bending loads are quite different that those encountered during normal operation. The root end of the airfoil will almost certainly have sufficient strength as a support location during transportation, and the tip end will most likely not have sufficient strength as a support location. Along some region between the root end and the tip end, there will exist sufficient strength to support the airfoil during transportation, and this region will be referred to herein as the midsection. The specific location of the midsection will vary from airfoil to airfoil. In some designs, it may be a narrowly specified portion of the airfoil length that the manufacturer has reinforced to bear transportation loads. In other designs, the midsection may be a broader region between the root end and the tip end.

At present, certain large wind turbine blades having a length of approximately 50 meters are in service, and larger blades having a length in excess of 50 meters will be deployed. However, the longest standard rail flatcars that are readily available have a coupler-to-coupler length of approximately 29 meters. This dictates that large airfoils must overhang the length of a single railcar during transportation. An approach to this length discrepancy is to mount the root end of an airfoil to the first car, and support the midsection of the airfoil on the second railcar, which is then referred to as a "sling" car. The misalignment that naturally occurs as a result of supporting a long object across two coupled railcars must be accommodated, and can be addressed by designing mounts that are flexible or articulated to address the misalignment during transportation.

Figure 1:
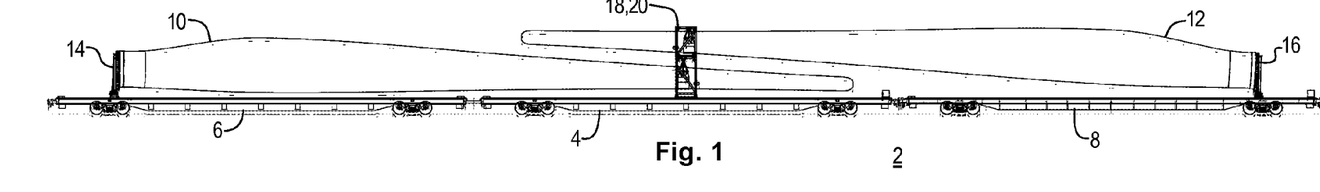
FIG. 1 is a side view drawing of a train carrying two airfoils according to an illustrative embodiment of the present invention.
Figure 2:
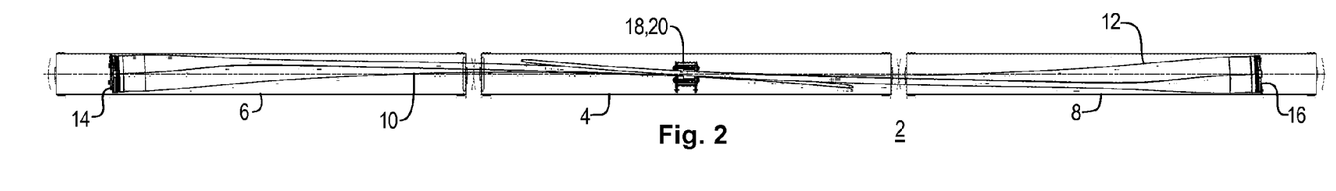
FIG. 2 is a plan view drawing of a train carrying two airfoils according to an illustrative embodiment of the present invention.

Reference is directed to FIG. 1 and FIG. 2, which are a side view drawing and a plan view drawing, respectively, of a train 2 carrying two airfoils 10, 12 according to an illustrative embodiment of the present invention. A center railcar 4, which is a flatcar in this embodiment, is coupled of a first railcar 6 and a second railcar 8 to form a three-car train 2. The root end of the first airfoil 10 is attached to the first railcar 6 using a first root bracket 14. Similarly, the root end of the second airfoil 12 is attached to the second railcar 8 using a second root bracket 16. Both of the root brackets 14, 16 are arranged to align the tip ends of the two airfoils 10, 12 over the center railcar 4. A dual sling stand assembly 18, 20 is attached to the center railcar 4, which individually supports the midsections of both airfoils 10, 12. The root brackets 14, 16 and the dual sling stand assembly 18, 20 accommodate misalignment of the airfoil longitudinal axes with respect to the railcar longitudinal axis, which occurs as the train 2 traverses curves and hills in the railroad. The design features employed to accomplish this will be more fully described hereinafter.

Figure 3:
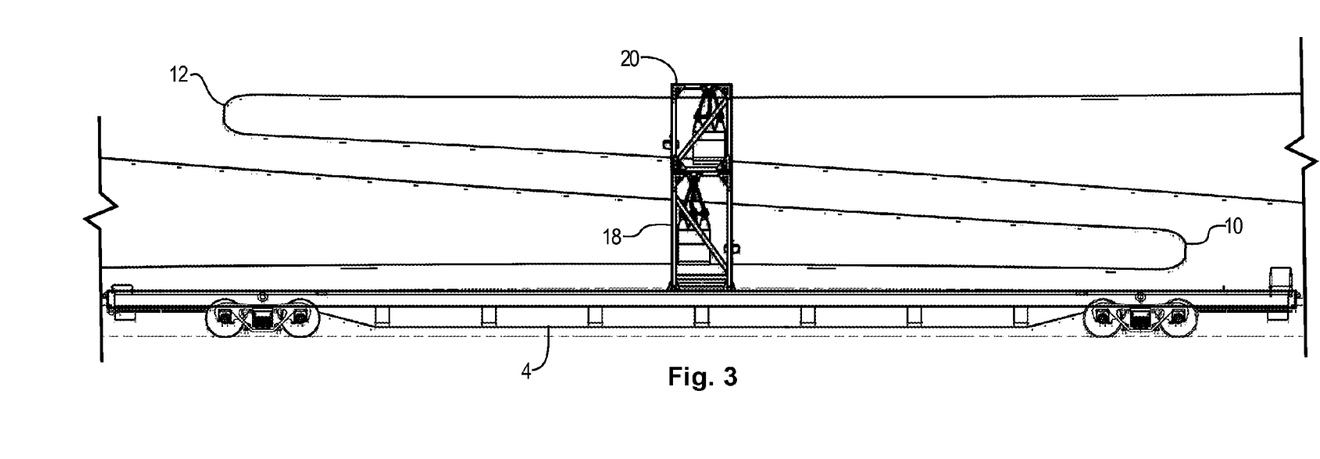
FIG. 3 is a detailed side view drawing of a train carrying two airfoils according to an illustrative embodiment of the present invention.

Reference is directed to FIG. 3, which is a detailed side view drawing of a train carrying two airfoils according to an illustrative embodiment of the present invention. FIG. 3 generally comports with FIGS. 1 and 2. FIG. 3 illustrates the center railcar 4 with the two airfoils 10, 12 supported from the dual sling stand assembly 18, 20. In this view, it can be appreciated that the dual sling stand assembly is comprised of a lower sling stand 18 that supports the first airfoil 10 and an upper sling stand 20 that is stacked on top of the lower sling stand 18, and which supports the second airfoil 12. In this manner, there is a single attachment to the center railcar 4, yet two sling stands needed for loading and for accommodating misalignment as the train traverses the railroad. Note that this misalignment is caused by both curves and hills along the railroad, and the attendant misalignment between the center rail car 4 and both of the first and second rail cars 6, 8 (not shown in FIG. 3).

Figure 4:
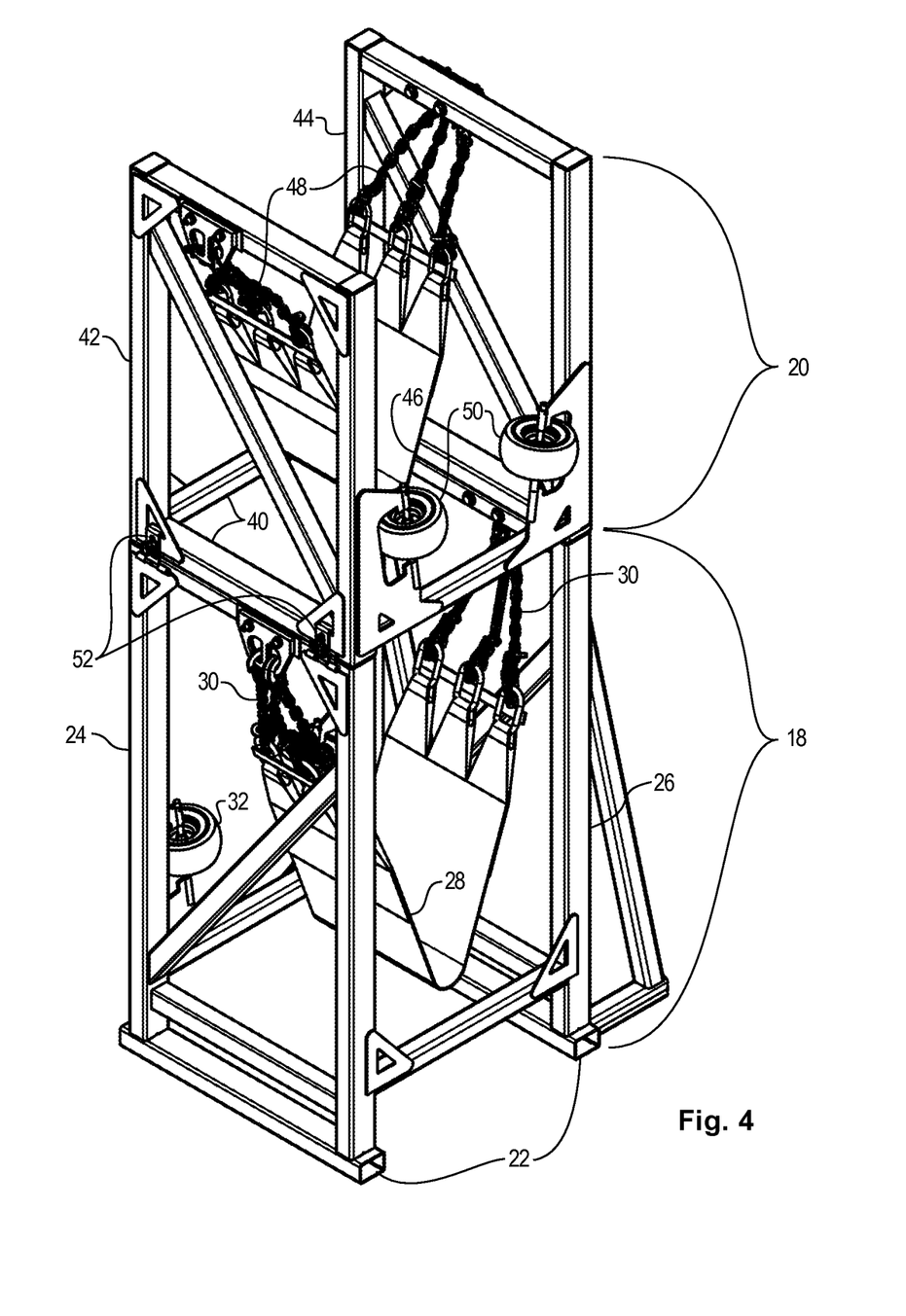
FIG. 4 is a perspective view drawing of a lower and upper sling stand according to an illustrative embodiment of the present invention.

Reference is directed to FIG. 4, which is a perspective view drawing of a lower sling stand 18 and upper sling stand 20 assembled together according to an illustrative embodiment of the present invention. This perspective view reveals further details about the structure and function of the dual sling stand assembly 18, 20. The lower sling stand 18 is generally comprised of a base portion 22 and two side members 24, 26, which extend upwardly from the base portion 22. The base portion 22 is adapted for connection to the host railcar, and in this embodiment it is flat for adaptation to a flatcar, where it can be welded in place or retained with suitable brackets. A sling 28 is hung and suspended between the side members 24, 26, and serves to engage and support the midsection of the first airfoil (not shown). In this embodiment, the sling 28 is fabricated from synthetic webbing material, and is further hung using plural steel chains 30. The chains 30 serve to provide flexibility to accommodate angular misalignment. A pair of rollers 32 (only one visible in this view) are rotatably supported from the lower sling stand 18, and serve to guide and limited the lateral movement of the airfoil (not shown) during transit.

The upper sling stand 20 in FIG. 4 is placed upon the lower side members 24, 26 of the lower sling stand 18. Note that the top of the lower sling stand 18 is open between the lower side members 24, 26 to enable insertion of the airfoil midsection (not shown) into the lower sling stand 18 to rest upon the lower sling 28. Once the airfoil is in place on the lower sling 28, then the upper sling stand 20 is placed upon the lower sling stand 18. The upper sling stand 20 is comprised of a base portion 30 and a pair of side members 42, 44 that extend upwardly from the base portion 30. An upper sling 46 is hung using plural chains 48 from the side members 42, 44. The upper sling is also fabricated from synthetic webbing material. The upper sling stand 20 has a pair of guide rollers 50 rotatably supported to engage the second airfoil (not shown) and limit lateral movement thereof.

The base 40 of the upper sling stand 20 in FIG. 4 rests upon the side members 24, 26 of the lower sling stand 18. Certain alignment members (not visible in FIG. 4) serve to align and fixedly locate the upper sling stand 20 directly over the lower sling stand 18. The upper sling stand 20 is retained in position using plural latches 52 about the periphery of the interface between the lower and upper sling stands. Once in place and latched, the second airfoil (not shown) is inserted into the upper sling stand 20 and onto the upper sling 46.

Figure 5:
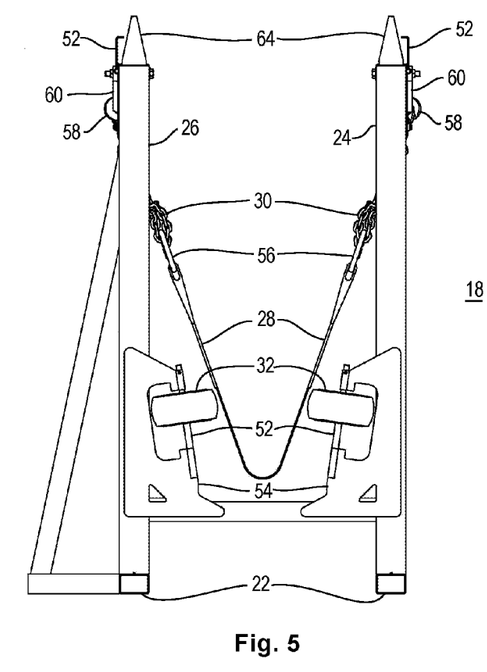
FIG. 5 is an end view drawing of a lower sling stand according to an illustrative embodiment of the present invention.
Figure 6:
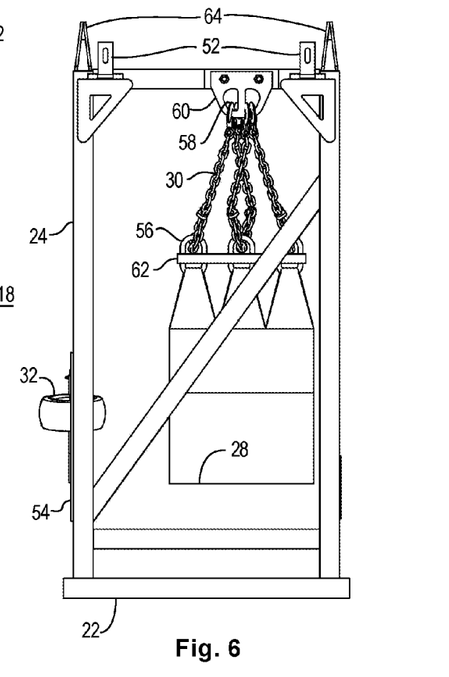
FIG. 6 is a side view drawing of a lower sling stand according to an illustrative embodiment of the present invention.

Reference is directed to FIG. 5 and FIG. 6, which are an end view drawing and side view drawing, respectively, of a lower sling stand 18 according to an illustrative embodiment of the present invention. The base 22 and side members 24, 26 are fabricated from mild steel structural tubing in the illustrative embodiment, which is generally 4"×4" and 4"×6" rectangular tubing. Actual materials may vary depending on structural loading requirements. Suitable gussets and diagonal bracing with additional structural members is also provide to ensure structural rigidity of the lower sling stand 18, and these members are also sized dependant on structural requirements. The top of the lower sling stand is open between the pair of side members 24, 26. A specialized pair of lower gussets 54 is shaped to support a pair of axles 52, which rotatably support a pair of rollers 32. In the illustrative embodiment, the rollers 32 are pneumatic tires on steel wheels with bearings that ride on the axles 52. The synthetic webbing lower sling 28 is terminated at each end with three steel rings 56. These rings are fixedly spaced apart by a steel spreader bar 62 that is welded to the rings 56. Plural chains 30 are connected to the plural rings 56. The upper ends of the chains 30 have steel hooks 58, which connect to a sling mounting plate 60, as shown. Plural latches 52 are mounted at the upper ends of the side members 24, 26, for interface with the upper sling stand (not shown). Note that the top of both vertical side members 24, 26 are terminated on each end with a lower alignment member 64. In the illustrative embodiment the lower alignment members are pyramidal structures fabricated from mild steel, which serve to guide the upper sling stand (not shown) into position and fixedly located it in position on the lower sling stand 18.

Figure 7:
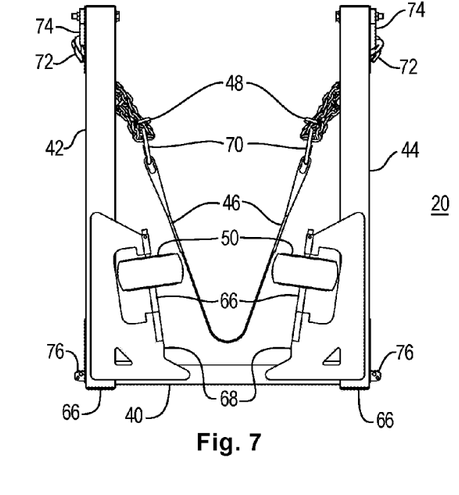
FIG. 7 is an end view drawing of an upper sling stand according to an illustrative embodiment of the present invention.
Figure 8:
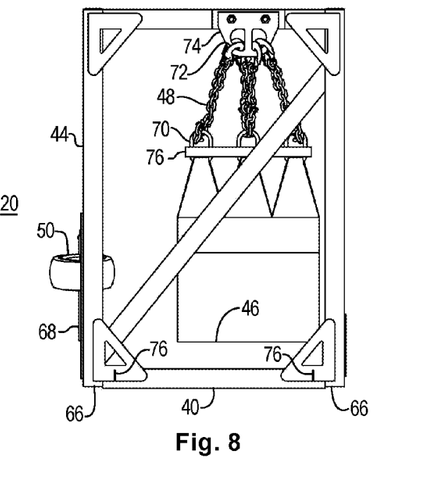
FIG. 8 is a side view drawing of an upper sling stand according to an illustrative embodiment of the present invention.

Reference is directed to FIG. 7 and FIG. 8, which are an end view drawing and side view drawing, respectively, of an upper sling stand 20 according to an illustrative embodiment of the present invention. The base 40 and side members 42, 44 are fabricated from mild steel structural tubing in the illustrative embodiment, which is generally 4"×4" and 4"×6" rectangular tubing. Actual materials sizes and wall thicknesses vary depending on structural loading requirements. Suitable gussets and diagonal bracing with additional structural members is also provide to ensure structural rigidity of the upper sling stand 20, and are also sized dependant on structural requirements. The top of the upper sling stand is open between the pair of side members 42, 44. A specialized pair of lower gussets 68 is shaped to support a pair of axles 66, which rotatably support a pair of rollers 50. In the illustrative embodiment, the rollers 50 are pneumatic tires on steel wheels with bearings that ride on the axles 66. The synthetic webbing upper sling 46 is terminated at each end with three steel rings 70. These rings are fixedly spaced apart by a steel spreader bar 76 that is welded to the rings 70. Plural chains 48 are connected to the plural rings 70. The upper ends of the chains 48 have steel hooks 72, which connect to a sling mounting plate 74, as shown. Plural latch tabs 76 are mounted around the base 40 for engaging the latches 52 (not shown) in the lower sling stand at the upper ends of the side members 24, 26, for interface with the upper sling stand (not shown). Note that the bottom of the base 40 exposes the open ends of structural tubes at the four corners of the upper sling stand 20, which serves as an upper alignment members 66. The upper alignment members 66 engage the lower alignment members 64 in the lower sling stand (not shown). These members cooperate to align and fixedly located the lower and upper sling stands together.

Figure 9:
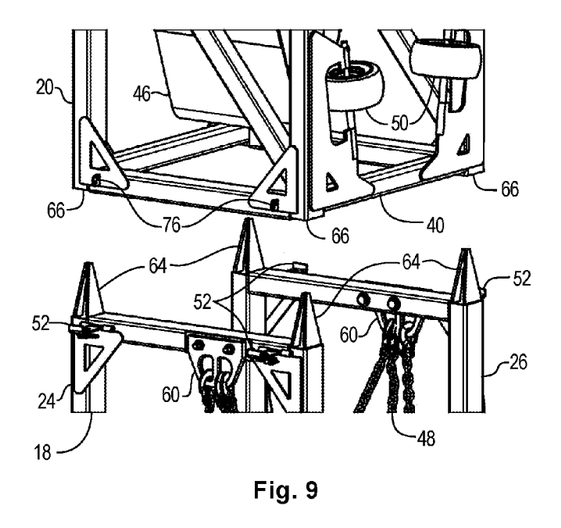
FIG. 9 is a perspective view detail of the sling stand alignment members according to an illustrative embodiment of the present invention.

Reference is directed to FIG. 9, which is a perspective view detail of the sling stand alignment members 64, 66 according to an illustrative embodiment of the present invention. Because the lower sling stand 18 supports the upper sling stand 20, which supports a portion of the weight of the airfoils, it is necessary to align and fixedly locate the upper sling stand 20 directly above the lower sling stand 18. This is accomplished, in part, using the aforementioned lower alignment members 64 and upper alignment members 66. FIG. 9 presents a clear view of the four pyramidal lower alignment members 64 that are inserted into the upper alignment members 66, which are open ends of structural tubes on the upper sling stand 20. It will be appreciated that other arrangements could be employed as guide members to guide the stands together and fixedly locate them.

Figure 10:
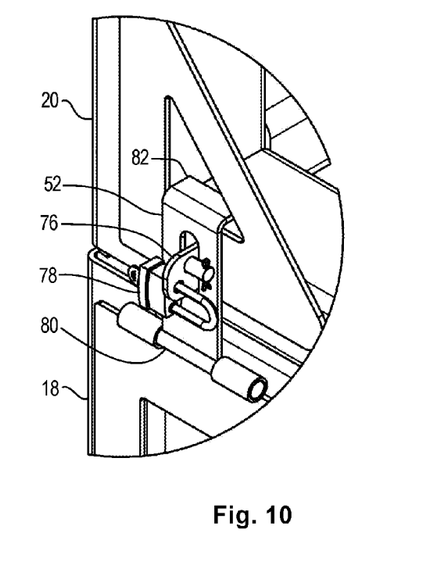
FIG. 10 is a perspective view detail of a latch and hasp arrangement between the lower and upper sling stands according to an illustrative embodiment of the present invention.

Reference is directed to FIG. 10, which is a perspective view detail of a latch and hasp arrangement between the lower and upper sling stands according to an illustrative embodiment of the present invention. The lower sling stand 18 has plural latches 52 that are connected with hinges 80 and are terminated with an angled clip 82 that engages a portion of the upper sling stand 20. The latch 52 has a slot for engaging the latch tabs 76 that are fixed to the upper sling stand. A padlock hasp 78 is inserted through the latch tabs 76 to lock the latch 52 in place, thereby securing the upper sling stand 20 in position in the lower sling stand 18.

Figure 11:
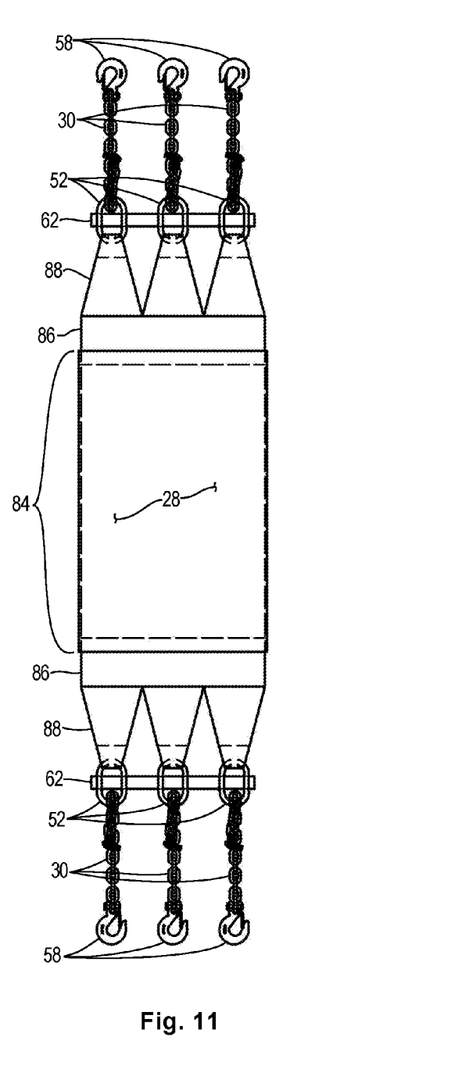
FIG. 11 is a drawing of a sling according to an illustrative embodiment of the present invention.

Reference is directed to FIG. 11, which is a drawing of a sling according to an illustrative embodiment of the present invention. The lower sling and upper sling are essentially the same, only requiring design consideration for length and weight bearing capacity. In FIG. 11, the lower sling 28 is illustrated. The sling is fabricated from synthetic webbing material, such as nylon, polypropylene, or similar materials. It could also be fabricated from cotton canvas. The central section 84 of the sling 28 is fabricated from a thickened layer of webbing to address strength and wear issues. A somewhat thinner layer 86 extends from the thickened layer 84, and continues to three tapered ends 88, which are inserted through the plural steel rings 52, folded back and sewn together as shown. The plural steel rings 52 are spaced apart to match the spacing of the three tapered ends 88, and are fixed together by welding to a steel strap 62. Chains 30 extend from the steel rings 52, and are terminated with steel hooks 58, which are attached to the respective sling stand.

Figure 12:
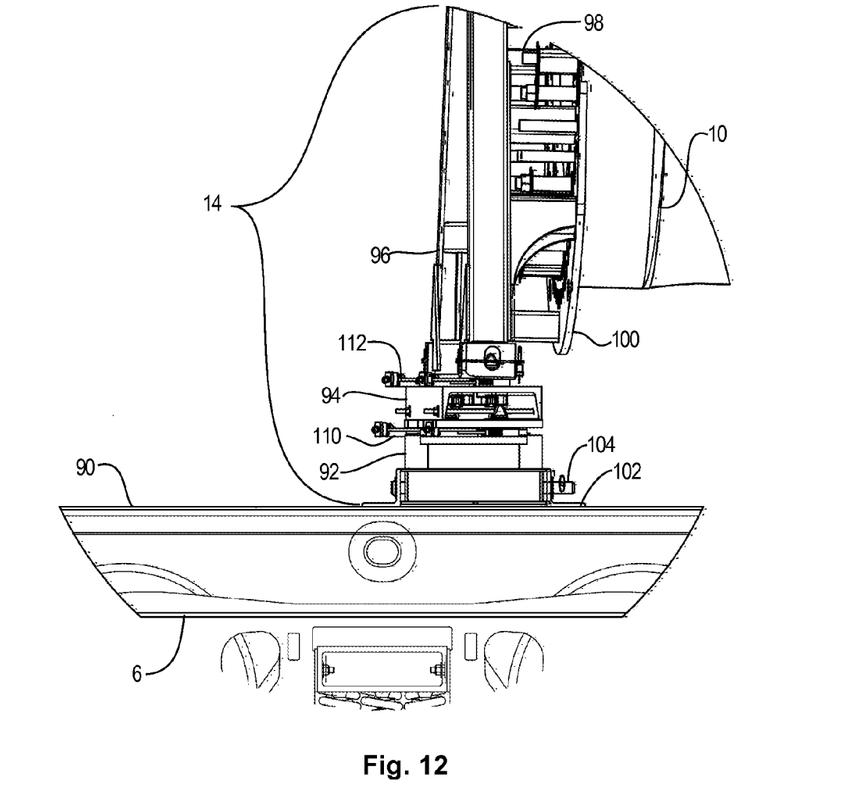
FIG. 12 is a side view drawing of a root bracket according to an illustrative embodiment of the present invention.
Figure 13:
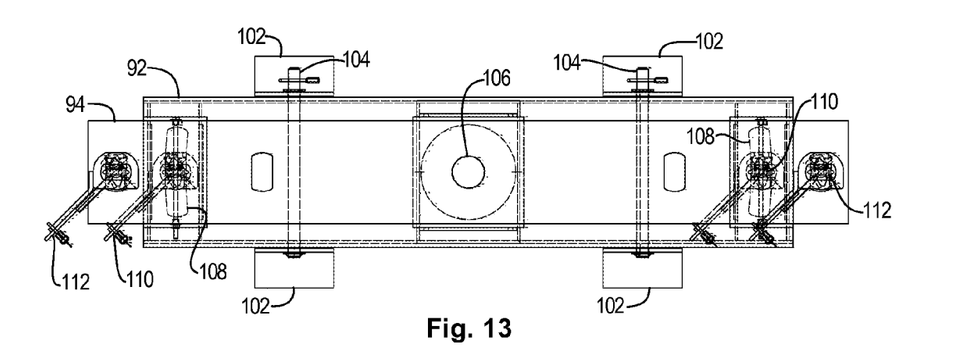
FIG. 13 is a top view drawing of a root bracket according to an illustrative embodiment of the present invention.

Reference is directed to FIG. 12 and FIG. 13, which are a side view drawing of a root bracket, and a top view drawing of a root bracket, respectively, according to an illustrative embodiment of the present invention. The root bracket 14 is attached to the steel deck 90 of the host railcar 6, which is a flatcar in the illustrative embodiment. Angle clips 102 are welded to the deck 90, and are then pinned 104 to the base 92 of the root bracket 14. The base 92 is connected to a swivel 94 using a pair of twist-lock fasteners 110, as are known in the art. The swivel 94 employs arcuate slots 108 for the twist-locks 110 so as to enable rotation about a vertical axis through a pin 106 at the center of the base 92. The swivel 94 further includes a second pair of twist-lock fasteners that engage a mounting frame 96 that is bolted 98 to the root end flange 100 of the airfoil 10. In this manner, the airfoil is removably attached to the railcar 6 using twist-lock fasteners, yet is enabled to rotate about the vertical axis at pin 106 to accommodate misalignment of the airfoil 10 with the railcars as the train traverses curves in the railroad.

Figure 14:
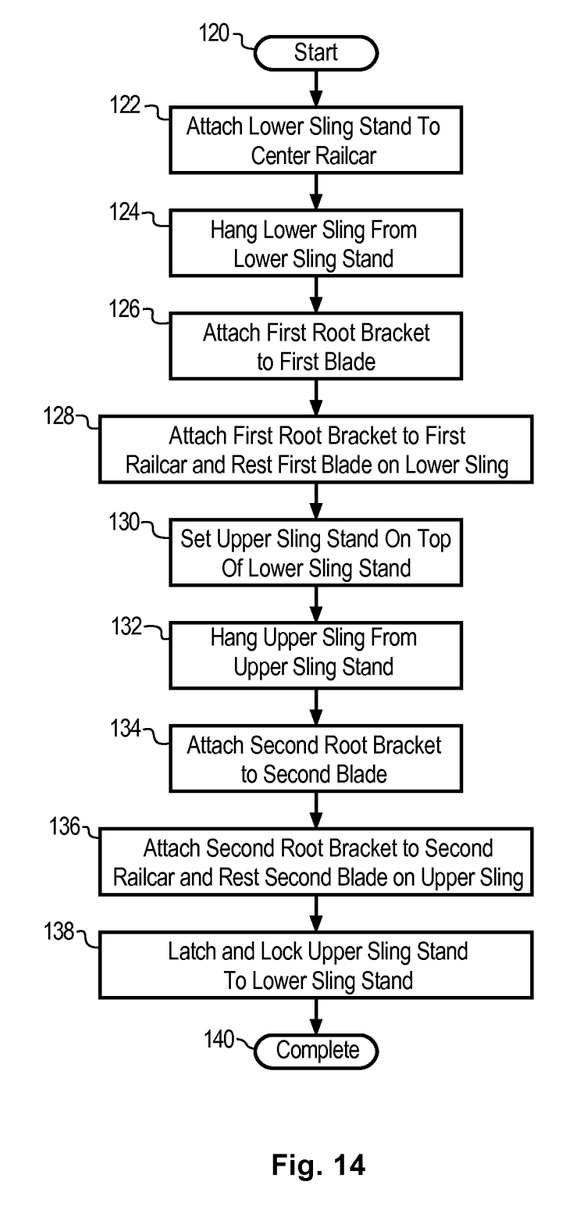
FIG. 14 is a process flow chart according to an illustrative embodiment of the present invention.

Reference is directed to FIG. 14, which is a process flow chart for loading a pair of airfoils onto a sling stand assembly according to an illustrative embodiment of the present invention. The process begins at step 120 and proceeds to step 122 where the lower sling stand is attached to the deck of the center railcar. At step 124, the lower sling is hung from the slower sling stand. At step 126, the first root bracket is attached to the first airfoil blade. At step 128, the first root bracket is attached to the first railcar while the first airfoil blade is rest upon the lower sling, thereby supporting the first airfoil blade on the train. At step 130, the upper sling stand is placed on top of the lower sling stand. At step 132, the upper sling is hung from the upper sling stand. At step 134, the second root bracket is attached to the root end of the second airfoil blade. At step 136, the second root bracket is attached to the second railcar while the second airfoil blade is rest upon the upper sling. At step 138, the sling stands are latched and locked together, which completes the process at step 140.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A system for transporting a first and second airfoil, each having a root end, midsection, and tip, using a center railcar coupled to a first and second railcar, comprising:
   a first bracket, for disposition between the root end of the first airfoil and the first railcar, which orients the tip of the first airfoil toward the center railcar;
   a second bracket, for disposition between the root end of the second airfoil and the second railcar, which orients the tip of the second airfoil toward the center railcar;
   a lower sling stand having a lower base, attachable to the center railcar, and a pair of lower side members extending upwardly therefrom that define an opening between said pair of lower side members through which the first airfoil can be inserted into said lower sling stand;
   a lower sling hung between said pair of lower side members to support the first airfoil along its midsection;
   an upper sling stand having an upper base, attachable to said pair of lower side members, and a pair of upper side members extending upwardly therefrom;
   an upper sling hung between said pair of upper side members to support the second airfoil along its midsection, and wherein
   said upper base is attachable to said pair of lower side members, thereby positioning said upper sling to support the midsection of the second airfoil above the midsection of the first airfoil.

2. The system of claim 1, further comprising:
   a lower lateral guide positioned to limit lateral movement of the first airfoil between said pair of lower side members, and
   an upper lateral guide positioned to limit lateral movement of the second airfoil between said upper pair of side members.

3. The system of claim 2, and wherein:
   said lower lateral guide includes a pair of lower rollers rotatably supported from said lower sling stand, and aligned to engage the first airfoil and limit lateral movement thereof, and
   said upper lateral guide include a pair of upper rollers rotatably supported from said upper sling stand, and aligned to engage the second airfoil and limit lateral movement thereof.

4. The system of claim 1, and wherein:
   said lower sling and said upper sling are comprised of plural webbing straps, and wherein
   said lower sling and said upper sling are removably attached to said lower sling stand and said upper sling stand, respectively, with plural chains, and wherein
   flexibility of said lower sling and said upper sling accommodate misalignment of said first airfoil and said second airfoil, respectively.

5. The system of claim 1, further comprising:
   a lower alignment member disposed about said pair of lower side members;
   an upper alignment member disposed about said upper base, for engaging said lower alignment member to thereby fixedly locate said upper sling stand above said lower sling stand.

6. The system of claim 5, and wherein:
   said lower alignment member comprises plural tapered extensions from said lower side members, and
   said upper alignment member comprises plural openings in said upper base that are sized to receive said plural tapered extensions.

7. The system of claim 1, further comprising:
   a latch disposed to secure said upper sling stand on said lower sling stand.

8. The system of claim 7, and wherein:
   said latch comprises at least a first hasp suitable to receive a security padlock.

9. The system of claim 1, and wherein:
   said first bracket and said second bracket enable rotation of the root end of said first airfoil and said second airfoil, respectively, about a vertical axis of rotation.

10. An apparatus for supporting the midsections of a first airfoil and a second airfoil above a railcar, comprising:
   a lower sling stand having a lower base, attachable to the railcar, and a pair of lower side members extending upwardly therefrom that define an opening between said pair of lower side members through which the first airfoil can be inserted into said lower sling stand;

a lower sling, comprised of plural webbing straps, hung between said pair of lower side members to support the first airfoil along its midsection;

an upper sling stand having an upper base, attachable to said pair of lower side members, and a pair of upper side members extending upwardly therefrom;

an upper sling, comprised of plural webbing straps, hung between said pair of upper side members to support the second airfoil along its midsection;

a pair of lower rollers rotatably supported from said lower sling stand, and aligned to engage the first airfoil and limit lateral movement between said pair of lower side members;

a pair of upper rollers rotatably supported from said upper sling stand, and aligned to engage the second airfoil and limit lateral movement between said upper pair of side members;

a lower alignment member disposed about said pair of lower side members, and an upper alignment member disposed about said upper base, for engaging said lower alignment member and thereby fixedly position said upper sling to support the midsection of the second airfoil above the midsection of the first airfoil.

11. A method of transporting a first and second airfoil, each having a root end, midsection, and tip, using a center railcar coupled to a first and second railcar, and using a first root bracket, a second root bracket, a lower sling stand having a lower base and a pair of lower side members extending upwardly therefrom that define an opening between the pair of lower side members, a lower sling, an upper sling stand having an upper base and a pair of upper side members extending upwardly therefrom, and an upper sling, the method comprising the steps of:

attaching the first root bracket between the root end of the first airfoil and the first railcar, thereby orienting the tip of the first airfoil toward the center railcar;

attaching the second root bracket between the root end of the second airfoil and the second railcar, thereby orienting the tip of the second airfoil toward the center railcar;

attaching the lower base of the lower sling stand to the center railcar;

hanging the lower sling between the pair of lower side members;

inserting the first airfoil into the opening between the pair of lower side members, and supporting the first airfoil, along its midsection, on the lower sling;

stacking the upper base of the upper sling stand on the pair of lower side members of the lower sling stand;

hanging the upper sling between the pair of upper side members;

supporting the second airfoil, along its midsection, on the upper sling, and thereby positioning the midsection of the second airfoil above the midsection of the first airfoil.

12. The method of claim 11, further comprising the steps of:

positioning a lower lateral guide with respect to the lower sling stand, thereby limiting lateral movement of the first airfoil between the pair of lower side members, and positioning an upper lateral guide with respect to the upper sling stand, thereby limiting lateral movement of the second airfoil between said upper pair of side members.

13. The method of claim 12, and wherein:

the lower lateral guide includes a pair of lower rollers rotatably supported from the lower sling stand, for engaging the first airfoil, thereby limiting lateral movement thereof, and the upper lateral guide includes a pair of upper rollers rotatably supported from the upper sling stand, for engaging the second airfoil, thereby limiting lateral movement thereof.

14. The method of claim 11, and wherein the lower sling and the upper sling are comprised of plural webbing straps, further comprising the steps of:

attaching the lower sling to the lower sling stand using plural chain;

attaching the upper sling to the upper sling stand using plural chains, and thereby accommodating misalignment of the first airfoil and the second airfoil by virtue of the flexibility of the chains.

15. The method of claim 11, and wherein the lower sling stand includes a lower alignment member disposed about the pair of lower side members, and the upper sling stand includes an upper alignment member disposed about the upper base, the method further including the steps of:

engaging the lower alignment member with the upper alignment member, thereby fixedly locating the upper sling stand above the lower sling stand.

16. The method of claim 15, and wherein:

the lower alignment member includes plural tapered extensions from the lower side members, and the upper alignment member includes plural openings in the upper base that are sized to receive the plural tapered extensions.

17. The method of claim 11, further comprising the step of:

securing the upper sling stand to the lower sling stand using a latch.

18. The method of claim 17, and wherein:

the latch includes at least a first hasp suitable for receiving a security padlock.

19. The method of claim 11, and wherein the first bracket and the second bracket include a vertical axis of rotation, and further comprising the steps of:

enabling rotation of the root end of the first airfoil and said second airfoil about the vertical axes of rotation.

* * * * *